United States Patent [19]
Roth

[11] 4,014,103
[45] Mar. 29, 1977

[54] MEASURING DEVICE

[76] Inventor: Leo Roth, 52-27 69th St., Maspeth, N.Y. 11377

[22] Filed: Sept. 17, 1975

[21] Appl. No.: 614,859

[52] U.S. Cl. .......................... 33/141 R; 33/141 E; 116/129 G
[51] Int. Cl.² ....................... G01B 3/12; G01B 7/04
[58] Field of Search ............. 116/129 G; 33/141 R, 33/141 C, 141 D, 141 E, 141 F, 141 G, 142

[56] References Cited
UNITED STATES PATENTS

| | | | |
|---|---|---|---|
| 1,975,675 | 10/1934 | Antelme | 116/129 G |
| 2,363,545 | 11/1944 | Morehead | 33/141 |
| 2,767,916 | 10/1956 | Anderson | 33/142 |
| 2,771,681 | 11/1956 | Reinking | 33/141 R |

Primary Examiner—Steven L. Stephan

[57] ABSTRACT

A measuring device which may be employed to afford both linear and non linear dimensional information without limitation as to quantity. The device is contained in a housing of circular cross section, the housing being manually rolled between the start and end points of that which is being measured automatically registering with the use of a ball marker the distance travelled between them. By reversing the direction of roll, subtraction is also automatically performed and registered. The device is particularly useful in measuring distances between points along circular or other non linear paths.

2 Claims, 3 Drawing Figures

MEASURING DEVICE

The invention relates to measuring instruments and, in particular, to such instruments which physically extend between the points of measurement.

The invention contemplates a measuring device which is physically displaced along the distances to be measured. The device is circular in configuration enabling it to be rolled through the distance. The circular housing contains a spiral guide and a ball marker which travels along the guide as the device is being rolled. Appropriate dimensional indicia is provided along the spiral route to afford an instantaneous indication of the distance travelled and hence the desired measurement. If the measurement is greater than the length of the spiral path within the housing, the latter may be turned about and the roll continued in the same direction until the device reaches the end point of the measured distance. By simply reversing the roll direction, subtraction may be performed by displacing the device along a distance corresponding to the subtrahend.

One object of the invention is to provide an improved measuring instrument that may be used to take measurement without limitation as to quantity or the configuration of the path whose length it is desired to measure.

Other objects and advantages of the invention may be appreciated on reading the following description of one of its embodiments which is taken together with the accompanying drawings, in which.

Figure 1:
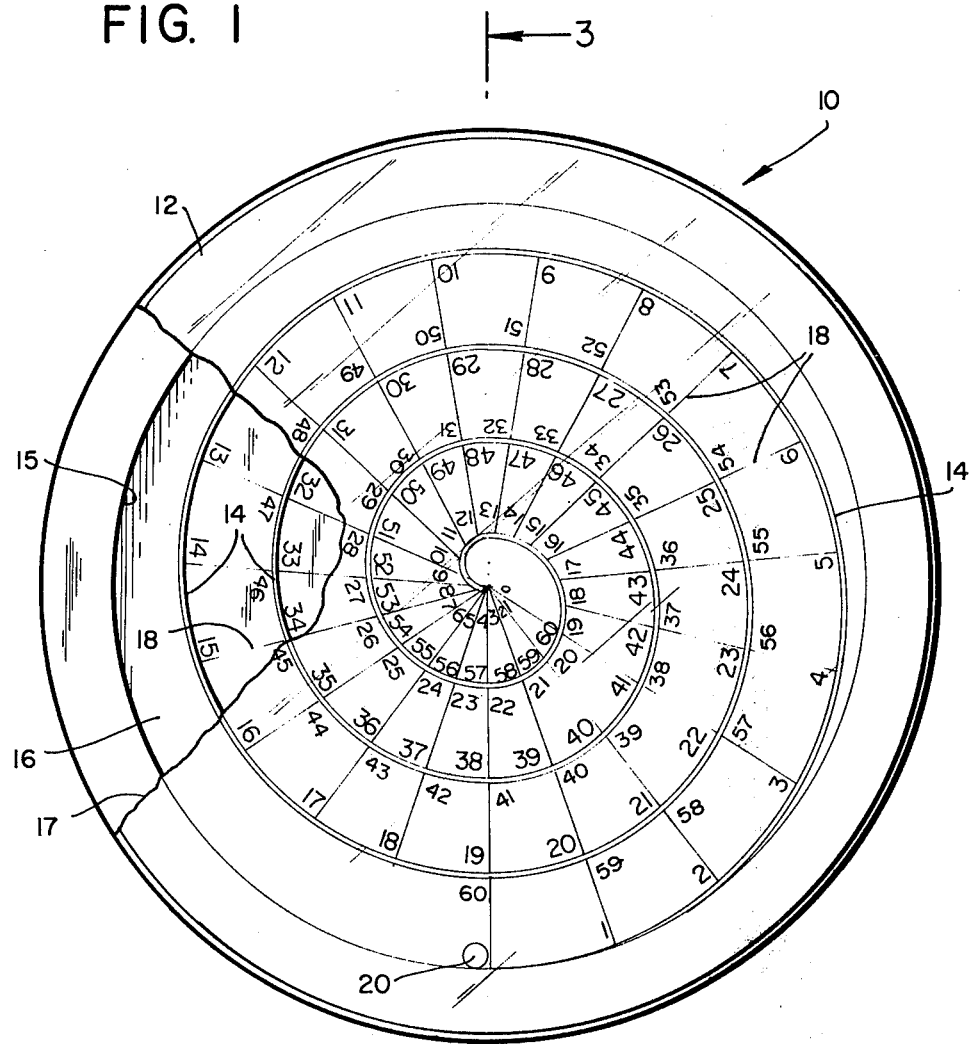
FIG. 1 is a front side view of the measuring device with the transparent cover partially broken away.
Figure 2:
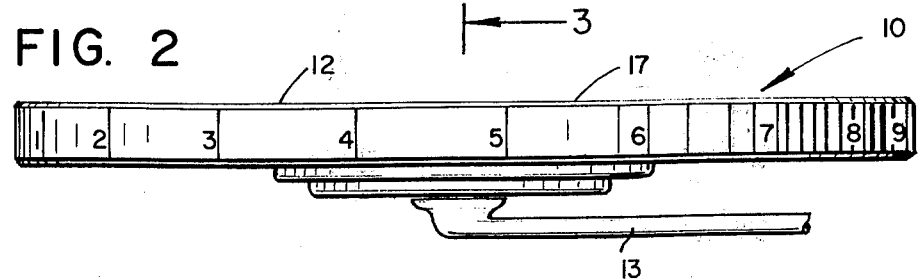
FIG. 2 is a top view of the device.
Figure 3:
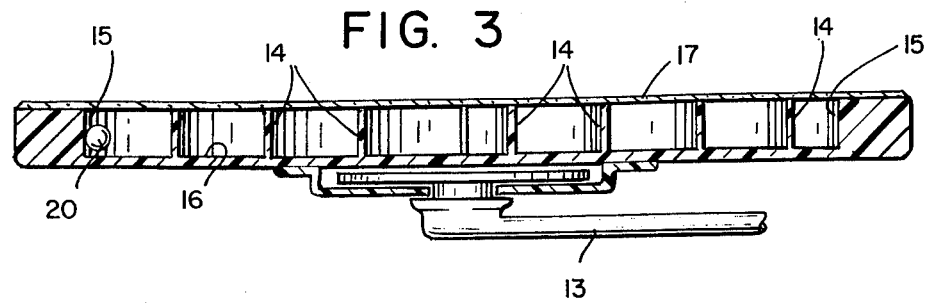
FIG. 3 is a section taken on the line 3—3 of FIG. 1.

Referring to the drawings, the measuring device 10 is contained in a housing 12 of circular outer configuration. There is provided within the housing a spiral guide 14 one end of which is attached to the inner surface of the circular housing wall 15 helically continuing from its attachment point to the center of the device.

The spiral guide 14 is mounted on a rounded base member 16 disposed within the housing 12 having a transparent cover 17. If desired, an arm 13 may be freely mounted at the center of the base member 16 as an aid to propelling the device along the measuring path. Measuring indicia in inches, centimeters, etc. is provided between radial lines 18 drawn from the center of the device to the wall 15. As ball marker 20 progresses in the guide 14 toward the center, while the device is being used for measurement, it is apparent that the ball marker moves along the spiral path a progressively shorter distance for each degree of turning covered by the device while it is being rolled. The areas defined by the guide and the radii display measurement indicia for the first completed roll of the marker to the center and additional indicia to indicate the distance covered by the device during the second roll, if needed, while the ball progresses back to its starting point from the center after the device is turned 180° on the point of surface contact reached the ball marker has reached the center of the device.

Various modifications of the invention may be effected by persons skilled in the art without departing from the scope and principle thereof as defined in the appended claims.

What is claimed is:

1. A distance measuring device having a peripheral housing of circular configuration, a base member providing the bottom surface of the device and secured to said housing, a transparent cover disposed over said peripheral housing, a spiral guide supported on said base member under said cover, said guide winding spirally from said housing and terminating proximate the axial center of said device and a ball marker confined by said cover and base member within the device and adapted to travel along the guide as the device is rolled from one point to another the distance between which measurement is desired.

2. A device as defined in claim 1 wherein radial lines are formed on the top surface of said base member extending from the center of said device and intersecting said guide, there being provided measuring indicia on the member in the areas defined by the guide and said lines.

* * * * *